E. & J. GREENWOOD.

DABBING MECHANISM USED IN WOOL COMBING OR THE LIKE.

APPLICATION FILED NOV. 22, 1911.

Reissued Feb. 23, 1915.

13,883.

2 SHEETS—SHEET 1.

Witnesses:

Carl L. Choate,

Horace A. Crossman.

Inventors:

Edgar Greenwood,

Joseph Greenwood, by Emery, Booth, Janney & Varney

Att'ys.

THE NORRIS PETERS CO., PHOTO-LITHO., WASHINGTON, D. C.

E. & J. GREENWOOD.

DABBING MECHANISM USED IN WOOL COMBING OR THE LIKE.

APPLICATION FILED NOV. 22, 1911.

Reissued Feb. 23, 1915. 13,883.

2 SHEETS—SHEET 2.

*Witnesses:*

Carl L. Choate.

Horace A. Crossman

*Inventors:*
*Edgar Greenwood,*
*Joseph Greenwood,* by Emery, Booth, Janney & Varney.
*Attys.*

THE NORRIS PETERS CO., PHOTO-LITHO., WASHINGTON, D. C.

UNITED STATES PATENT OFFICE.

EDGAR GREENWOOD AND JOSEPH GREENWOOD, OF BRADFORD, ENGLAND, ASSIGNORS TO HIRAM J. POTTER, OF BROOKLINE, MASSACHUSETTS, JOHN W. COGGESHALL, OF CRANSTON, RHODE ISLAND, AND LOUIS M. BOWES, OF NEWTON HIGHLANDS, MASSACHUSETTS.

DABBING MECHANISM USED IN WOOL-COMBING OR THE LIKE.

13,883. Specification of Reissued Letters Patent. Reissued Feb. 23, 1915.

Original No. 838,321, dated December 11, 1906, Serial No. 278,353. Application for reissue filed November 22, 1911. Serial No. 661,873.

*To all whom it may concern:*

Be it known that we, EDGAR GREENWOOD and JOSEPH GREENWOOD, subjects of the King of Great Britain, and residents of Bradford, in the county of York, England, have invented an Improvement in Dabbing Mechanism Used in Wool-Combing or the like, of which the following description, in connection with the accompanying drawings, is a specification, like characters on the drawings representing like parts.

This invention relates to improvements in "dabbing" mechanism used in wool-combing or the like, and has for its object the construction and arrangement of an adjustable automatic dabbing apparatus, which may be applied, by preference, to any Noble's wool-combing machine in such a manner that the use of brushes which are liable to great wear and tear is obviated and that should hard or bulky substances pass to the combs either along with the wool or the like or accidentally such substances will cause the "dabber" to lift automatically and allow them to pass without injury to the combs or dabber.

In describing our invention in detail reference is made to the accompanying sheet of drawings, similar letters indicating similar parts, in which—

Figure 1:
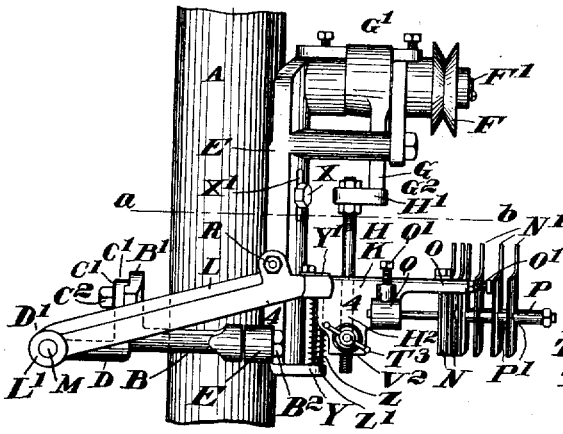
Figure 2:
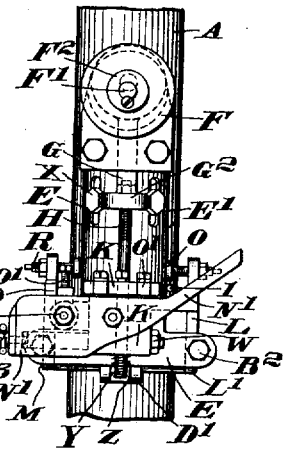
Figure 3:
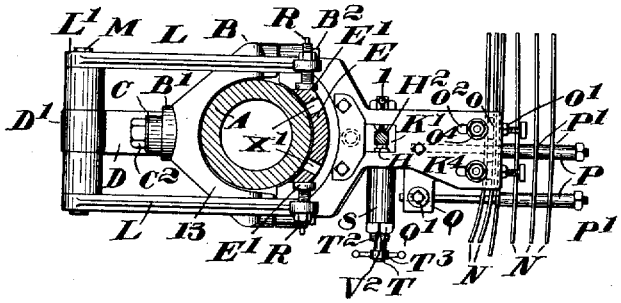
Figure 4:
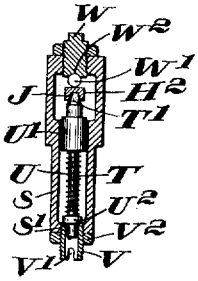
Figure 5:
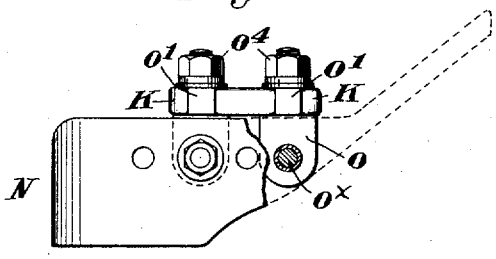
Figure 6:
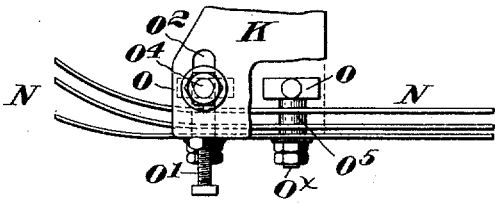
Figure 7:
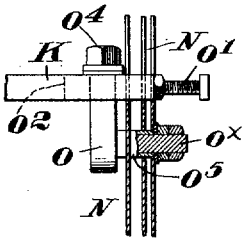
Figure 8:
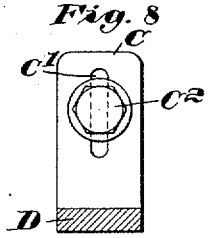

Figure 1 represents a side elevation of the mechanism employed; Fig. 2 represents a sectional plan on line *a*—*b* of Fig. 1; Fig. 3 represents an end elevation; Fig. 4 is a section on the line 4—4 of Fig. 1; and Figs. 5, 6, 7 and 8 are detail views.

In carrying out our invention the pillar A, which is that portion of the framework of a Noble's comb which projects above and through the center of one of the small comb circles, is partially surrounded by bracket B, such bracket being substantially Y-shaped, as shown in Fig. 2. The base B′ of the said bracket is turned upward, as shown in Fig. 1. Such upturned portion engages with a similar upturned portion C of bracket D, which is provided with a slot C′, Fig. 8. A set-screw or the like $C^2$ passes through slot C′ into portion B′ for purposes of adjustment should such be required. The bracket D terminates in a bearing D′.

Attached to the bracket B by means of set screws $B^2$ or the like is another bracket E, which abuts against the pillar A and is partly circular in shape. Guide-faces E′ are formed at the sides thereof. The upper portion of bracket E carries the driving mechanism of the dabber, such mechanism consisting of driving pulley F, which actuates a shaft F′ and crank $F^2$ or other eccentric movement. The crank $F^2$ is surrounded by the boss G′ of connecting-rod G, such connecting-rod terminating in a foot $G^2$, provided with a slot H′, with which engages the adjustable rod H. The rod H is of suitable length and is formed square toward its lower end, as shown at $H^2$. A conical hole J is formed in one of the squared faces of the rod H for the purpose hereinafter described.

The rod H passes through an aperture K′, formed in the dabber-carrier K. Such carrier is attached to or forms part of the Y-shaped lever L, the two arms of which terminate in bearings L′. A shaft M passes through these bearings into bearing D′, above referred to. The shaft M may be withdrawn when required.

The dabber itself consists of a suitable number of knives N and N′, the knives N being for the smaller comb-circle and N′ for the larger one.

The knives N are mounted on small pins $o^x$ and the distance apart of such knives regulated by sleeves $o^5$ on the said pins. Such pins may form part of the arms O. The arms O pass upward into recesses or slots $O^2$ in the dabber-carrier K and are held firmly in position by means of nuts or the like $O^4$, which may be loosened when required, and the knives N moved toward or from the pillar A and retained in the adjusted position by means of adjusting nuts and screws, as O′, or in any other convenient manner. Two knives are shown in the drawings; but it must be understood that any desired number may be used.

The knives N′ are arranged a suitable distance apart on rods P, and holes P′ are provided in knives N′ to allow the rods P to pass through same. The ends of rods P are retained in sockets Q, attached to the dabber-carrier K, and set-screws Q′ provided, whereby the said rods, and thereby knives N′, may be adjusted and fixed. The knives may be otherwise suitably adjusted as regards their distance apart.

The arms of lever L are provided with adjustable screws or the like R, which act on guide faces E′ in order to prevent any longitudinal movement of the dabber.

Immediately below the surface K′ in dabber-carrier K is a hollow boss S, Fig. 4, screwed internally for some little distance at S′, said boss S being integral with the carrier K.

A pin T, terminating in a conical end T′, passes through boss S, such pin being provided with collars U′ and $U^2$, U′ being fixed and $U^2$ being loose, and a spiral spring U surrounds the said pin between such collars. An external threaded collar V engages the thread S′ at the end of boss S, such collar being provided with a cross-cut V′, as shown. A lock nut $V^2$ surrounds the projecting thread of collar V. The pin T is provided with a cross-pin $T^2$ and a handle $T^3$. The conical end T′ of the pin engages with the conical aperture J in rod H and may be brought out of contact by pulling the handle $T^3$ and turning the pin $T^2$ out of engagement with the cross cut V′.

An adjusting screw W is provided opposite the pin T, such screw having a ball W′ and ball race $W^2$, provided, as shown in Fig. 4, in order to retain the rod H in position.

Bolts X are provided in the pillar A, and slots X′ are formed in the bracket E for the reception of the same. The bracket E is provided with a foot Y and a coiled spring Z and Z′ placed between such foot and the plate Y′, attached to the dabber-carrier K, as shown in Fig. 1.

In operation the mechanism is placed in position around pillar A and adjusted as to alinement by means of set screw $C^2$. The rod H is also adjusted and the requisite number of knives N and N′ placed in the required position. The bases of these knives at the top of the stroke project a slight distance below the top of the comb pins. The conical end T′ of pin T engages with the conical hole J. The pulley F is then driven in any convenient manner and the connecting rod G operated, causing the rod H to move the dabber-carrier K up and down, such dabber-carrier being centered by means of the Y-shaped lever L on shaft M. The spring Z is alternately compressed and relaxed by the action of the dabbing motion, and the relaxation of the same naturally tends to assist the movement. The rod on which the spring is mounted is to serve the purpose of a guide and support for the spring. Should any hard bulky body pass along with the combs, the knives N or N′ will tend to be raised. This will cause the end T′ of pin T to leave the conical hole J, and the knives will be raised, thus allowing the obstruction to pass under and clear of the knives. The carrier K will then resume its original position, the pin T′ returning automatically to aperture J. Should the knives require to be raised, the pin T may be drawn out, as before described, and the carrier raised. A further stop or catch *l* may be provided in the upper portion of carrier K whereby the said carrier may be held in the raised position.

It will be understood that for a Noble's comb two of the above-described apparatus will be required.

What we claim as our invention is—

1. A dabbing-machine comprising a carrier K, a reciprocating rod G, a rod H adjustably connected to the rod G, said rod H having a conical hole therein, a pin T slidably mounted in the carrier K, a spring for normally holding said pin with its point in engagement with the conical hole and antifriction means on the carrier K coacting with the rod H.

2. In combination with the bracket E, a second bracket D adjustably secured thereto, a shaft M carried by the bracket D, a carrier K connected to said shaft, knives adjustably mounted on said carrier, an adjustable rod H yieldingly connected to said carrier, means carried by the bracket E for reciprocating the rod H and a spring supported on the bracket for assisting the travel of the carrier K.

3. Dabbing mechanism for wool combing machines comprising in combination, dabbing devices mounted for bodily reciprocation between the comb pins, a carrier for said devices, reciprocating means to impart up and down reciprocating movements to said carrier, while maintaining the lower edges of said dabbing devices between the said pins, and a yielding connection between said carrier and said reciprocating means and adapted to yield when excessive obstruction is presented to the dabbing devices.

4. Dabbing mechanism for wool combing machines comprising in combination, a pillar, a lever pivotally supported by said pillar, said lever being Y-shaped to extend upon opposite sides of said pillar, the latter having lever guiding means to engage the members of said lever, dabbing devices carried by said lever, and means to impart up and down reciprocations to said lever.

5. Dabbing mechanism for wool combing machines comprising in combination a support, a lever having at one end an adjustable pivot carried by said support, said lever being Y-shaped to embrace said support, the latter having guiding surfaces to control the movements of the lever, dabbing devices carried by said lever, and means to impart up and down reciprocations to said lever.

6. Dabbing mechanism for wool combing machines comprising in combination a pillar or support, a lever having a pivot adjustably carried by said pillar or support, an eccentric, connecting devices between said eccentric and said lever to impart up and down movements to the latter, and dabbing knives carried by said lever transversely to the length of the latter and bodily movable thereby, the construction and arrangement of the eccentric and connecting devices being such that the lower edges of the bodily movable dabbing knives are maintained at all times in operation below the points of the comb pins.

7. Comb dabbing mechanism for wool combing machines comprising in combination a bracket E, a shaft M supported by said bracket E, a carrier K pivotally mounted upon said shaft, knives adjustably mounted on said carrier and bodily movable thereby, a rod H connected to said carrier, and means carried by the bracket E for reciprocating the rod H.

8. Comb dabbing mechanism for wool combing machines comprising in combination a bracket E, a shaft M supported by said bracket, a carrier K connected to said shaft, knives adjustably mounted on said carrier, rod H yieldingly connected to said carrier, and means carried by the bracket E for reciprocating the rod H.

9. Comb dabbing mechanism for wool combing machines comprising in combination a carrier K, dabbing devices mounted upon said carrier, reciprocating means connected to said carrier for imparting up and down movements thereto, and yielding devices between said carrier and said reciprocating means including two members, one of which is socketed and the other of which has a projection normally entering said socket but adapted to be displaced therefrom when excessive obstruction is presented to the dabbing devices.

10. Comb dabbing mechanism for wool combing machines comprising in combination, a carrier, dabbing devices mounted thereon, reciprocating means for said carrier to impart up and down movements thereto, and a yielding frictional connection between said carrier and said reciprocating means, said connection being adapted to yield when excessive obstruction is presented to the dabbing devices.

11. Comb dabbing mechanism for wool combing machines comprising in combination, a carrier, dabbing devices mounted thereon, reciprocating means for said carrier to impart up and down movements thereto, and a spring pressed, yielding, frictional connection between said carrier and said reciprocating means, said connection being adapted to yield when excessive obstruction is presented to the dabbing devices.

12. Comb dabbing mechanism for wool combing machines comprising in combination, a carrier, dabbing devices mounted thereon, reciprocating means for said carrier to impart up and down movements thereto, and an interengaging, yielding, frictional connection between said carrier and said reciprocating means, said connection being adapted to yield when excessive obstruction is presented to the dabbing devices.

13. Comb dabbing mechanism comprising, in combination with a reciprocating mechanism having yielding connections with the dabber carrier, a dabbing carrier having arms extending therefrom, a supporting bracket and a bracket adjustably connected to the supporting bracket, the arms of the carrier being pivotally mounted in the adjustable bracket.

In testimony that we claim the foregoing as our invention, we have each signed our names in the presence of two witnesses this 31st day of October, A. D. 1911, and this tenth day of November, A. D. 1911.

EDGAR GREENWOOD.
JOSEPH GREENWOOD.

Witnesses as to the signature of Edgar Greenwood:

ROBERT H. KAMMLER,
IRVING U. TOWNSEND.

Witnesses as to the signature of Joseph Greenwood:

JAMES CLARKSON,
GEORGE LONGBOTTOM.

Copies of this patent may be obtained for five cents each, by addressing the "Commissioner of Patents, Washington, D. C."